(12) United States Patent
Gaudreau, Jr.

(10) Patent No.: US 8,998,318 B2
(45) Date of Patent: Apr. 7, 2015

(54) CHILD RESTRAINT WITH TILTABLE JUVENILE SEAT

(75) Inventor: Paul D. Gaudreau, Jr., Indianapolis, IN (US)

(73) Assignee: Cosco Management, Inc., Wilmington, DE (US)

( * ) Notice: Subject to any disclaimer, the term of this patent is extended or adjusted under 35 U.S.C. 154(b) by 299 days.

(21) Appl. No.: 13/589,995

(22) Filed: Aug. 20, 2012

(65) Prior Publication Data

US 2013/0043706 A1 Feb. 21, 2013

Related U.S. Application Data

(60) Provisional application No. 61/525,095, filed on Aug. 18, 2011.

(51) Int. Cl.
*A47D 1/10* (2006.01)
*B60N 2/28* (2006.01)

(52) U.S. Cl.
CPC ............ *B60N 2/2821* (2013.01); *B60N 2/2872* (2013.01); *B60N 2/2875* (2013.01)

(58) Field of Classification Search
CPC .... A47C 1/026; B60N 2/4221; B60N 2/2821; B60N 2/286

USPC .......... 297/256.13, 256.16, 250.1, 256.1, 328
See application file for complete search history.

(56) References Cited

U.S. PATENT DOCUMENTS

| | | | |
|---|---|---|---|
| 5,836,650 A | 11/1998 | Warner, Jr. et al. | |
| 6,139,101 A | 10/2000 | Berringer et al. | |
| 6,196,629 B1 * | 3/2001 | Onishi et al. ............ | 297/256.12 |
| 6,544,358 B1 | 4/2003 | Carr et al. | |
| 7,059,677 B2 * | 6/2006 | Balensiefer et al. ..... | 297/256.13 |
| 7,086,695 B2 * | 8/2006 | Hosoya .................... | 297/256.16 |
| 7,090,294 B2 * | 8/2006 | Balensiefer et al. ..... | 297/256.14 |
| 7,887,128 B2 | 2/2011 | Zink et al. | |
| 2001/0008349 A1 * | 7/2001 | Yamazaki .................. | 297/250.1 |
| 2002/0084680 A1 * | 7/2002 | Kain ........................ | 297/256.13 |
| 2003/0151285 A1 * | 8/2003 | Keegan et al. ........... | 297/256.13 |
| 2004/0262967 A1 * | 12/2004 | Furui ........................ | 297/256.1 |
| 2006/0250005 A1 * | 11/2006 | Keegan et al. ........... | 297/256.13 |
| 2009/0322132 A1 * | 12/2009 | Gillett ...................... | 297/256.13 |

* cited by examiner

*Primary Examiner* — David R Dunn
*Assistant Examiner* — Alexander Harrison
(74) *Attorney, Agent, or Firm* — Barnes & Thornburg LLP

(57) ABSTRACT

A child restraint includes a seat base and a juvenile seat. The juvenile seat is tiltable relative to the seat base at the option of a caregiver.

17 Claims, 9 Drawing Sheets

CHILD RESTRAINT WITH TILTABLE JUVENILE SEAT

PRIORITY CLAIM

This application claims priority under 35 U.S.C. §119(e) to U.S. Provisional Application Ser. No. 61/525,095, filed Aug. 18, 2011, which is expressly incorporated by reference herein.

BACKGROUND

The present disclosure relates to a child restraint, and articularly to a child restraint with a tiltable juvenile seat. More particularly, the present disclosure relates to a tiltable juvenile seat that can be locked to a base in an upright or one of several tilted positions.

SUMMARY

A child restraint in accordance with the present disclosure includes a seat base and a tiltable juvenile seat. The tiltable juvenile seat is mounted on the seat base for pivotable movement about a pivot axis between an upright position and a tilted position. The seat base is adapted to set on a passenger seat in a vehicle.

In illustrative embodiments, the child restraint also includes a seat lock coupled to a seat shell included in the tiltable juvenile seat to move therewith. The seat lock is configured to include means for mating with an anchor included in the seat base to retain the seat shell of the tiltable juvenile seat in a selected tilted position.

In illustrative embodiments, the seat-lock includes a spring-biased slidable seat-motion blocker mounted for back-and-forth sliding movement on a seat-lock support located below and coupled to a seat bottom of the tiltable juvenile seat. The seat-motion blocker is formed to include anchor-receiver channels sized to receive the anchor therein. To establish a tilted position, a caregiver pulls the seat-motion blocker outwardly away from the seat bottom to compress a blocker-biasing spring interposed between the seat-motion blocker and the seat-lock support, pivots a seat shell included in the tiltable juvenile seat about the pivot axis, and releases the seat-motion blocker to allow the blocker-biasing spring to expand and move the seat-motion blocker relative to the seat shell of the tiltable juvenile seat to cause the anchor to lie in one of the anchor-receiver channels to retain the seat shell of the tiltable juvenile seat in the selected tilted position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 9 provides a sectional view of the slidable seat-motion blocker mounted for sliding movement on a slide plate included in the seat-lock support and shows that the slidable seat-motion blocker includes a pull handle (on the right), a vertically extending first anchor mount (on the left) formed to include three anchor-receiver channels, a central glider (in the center) arranged to interconnect the pull handle and the first anchor mount and configured to slide back and forth on the underlying slide plate of the seat-lock support, and a spring mount located below the central glider and coupled to a left-side end of the blocker-biasing spring and showing that the first anchor mount is arranged to lie substantially below the rod-shaped first anchor that is coupled to the upper portion of the foundation included in the seat base when the seat shell of the tiltable juvenile seat is oriented to lie in the upright position relative to the seat base so that the first anchor does not extend into any of the three anchor-receiver channels formed in the first anchor mount of the slidable seat-motion blocker;

DETAILED DESCRIPTION

Figure 1:
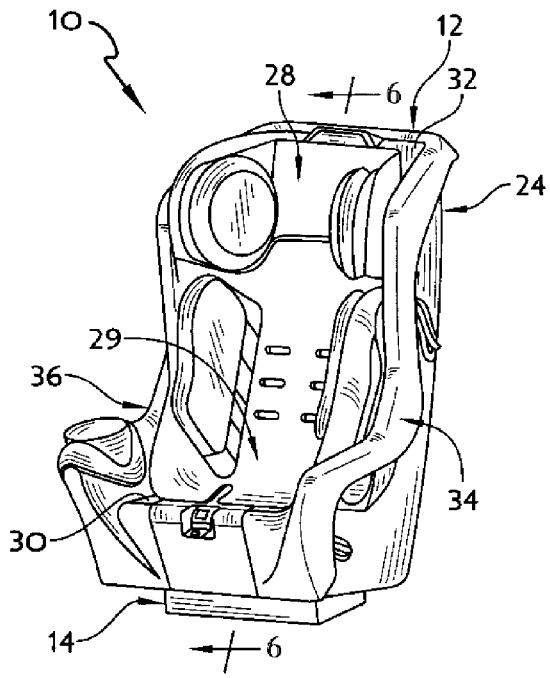
FIG. 1 is a perspective front view of a child restraint showing a seat shell included in a tiltable juvenile seat oriented to lie in an upright position relative to an underlying seat base.
Figure 2:
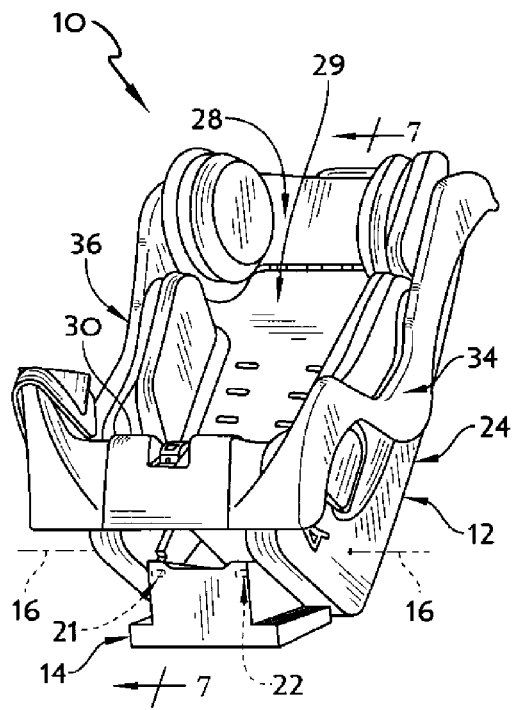
FIG. 2 is a perspective view similar to FIG. 1 showing the seat shell of the tiltable juvenile seat retained in a tilted position relative to the seat base.
Figure 6:
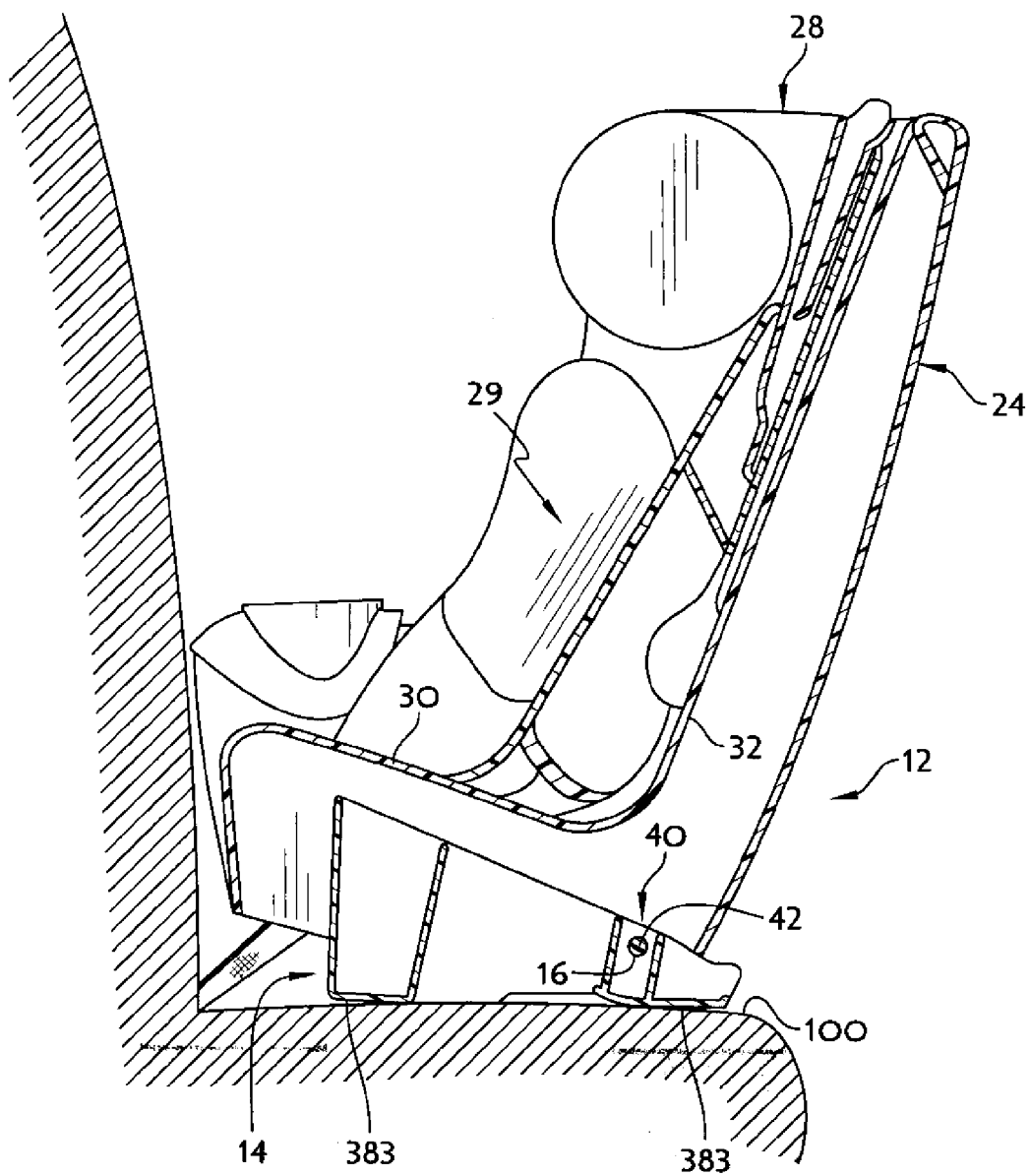
FIG. 6 is a sectional view taken along line 6-6 of FIG. 1 showing a seat shell of a tiltable juvenile seat in a rearwardly facing upright position on a companion seat base that is placed on a passenger seat in a vehicle.
Figure 7:
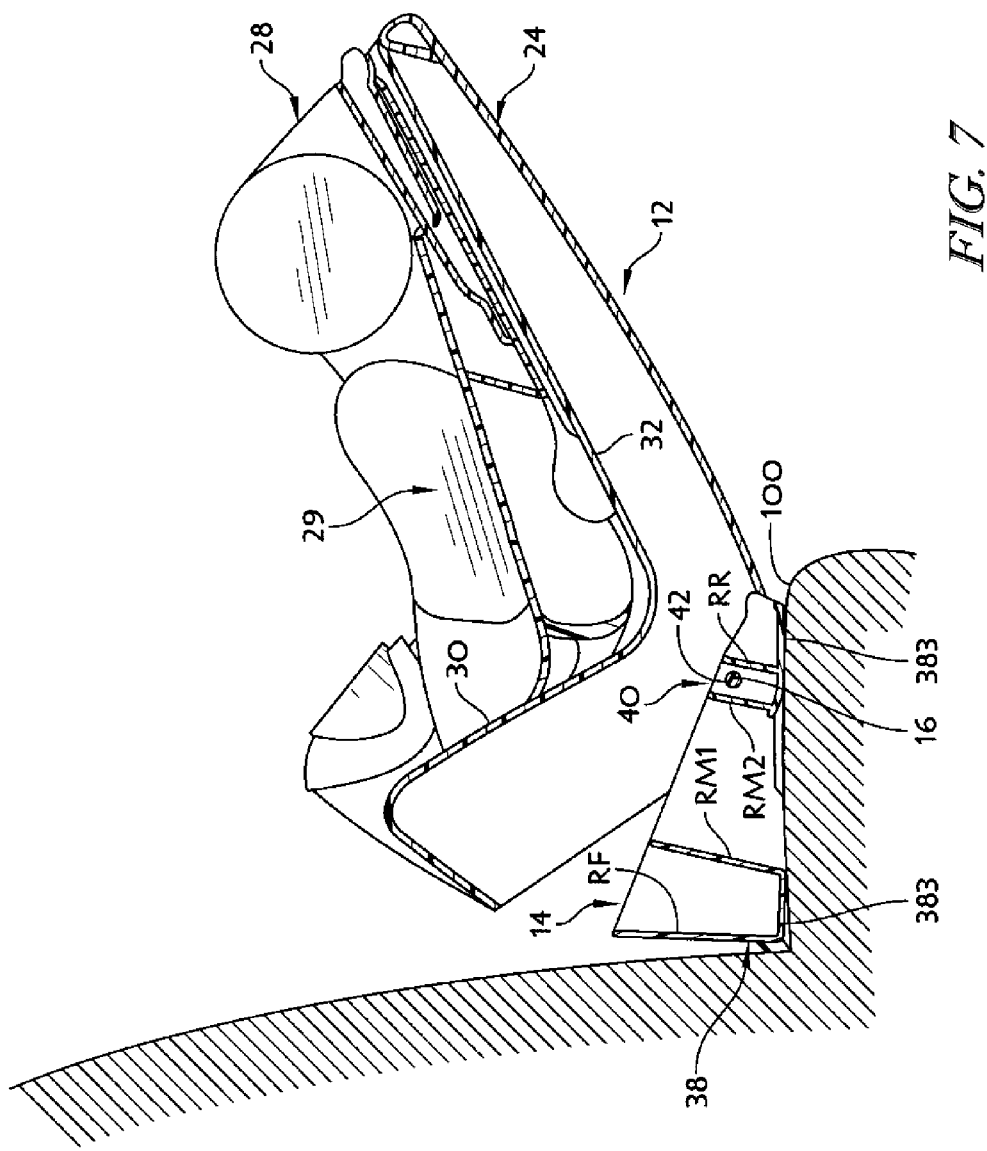
FIG. 7 is a sectional view taken along line 7-7 of FIG. 2 showing a seat shell of a tiltable juvenile seat in a rearwardly facing tilted position on a companion seat base placed on a passenger seat in a vehicle.

A child restraint 10 includes a tiltable juvenile seat 12 comprising a seat shell 24 mounted on an underlying seat base 14 for pivotable movement about a horizontal pivot (tilt) axis 16 between an upright position shown, for example, in FIGS. 1 and 6 and a tilted position shown, for example, in FIGS. 2 and 7. Child restraint 10 also includes a seat lock 18 having a pull handle 20 as suggested in FIGS. 3 and 4.

Seat lock 18 is configured to provide caregiver-controlled means for releasably retaining a seat shell 24 included in tiltable juvenile seat 12 in an upright position and a selected one of three available tilted positions. Seat lock 18 lies under a seat bottom 30 of seat shell 24 and includes a spring-biased slidable seat-motion blocker 70 coupled to pull handle 20 as suggested in FIG. 4.

Figure 3:
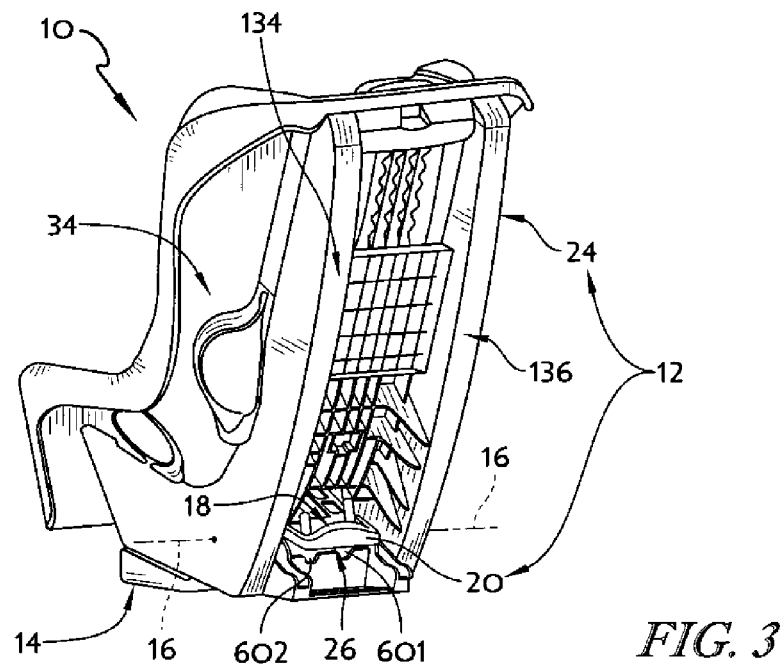
FIG. 3 is a perspective rear view of the child restraint of FIG. 1.
Figure 4:
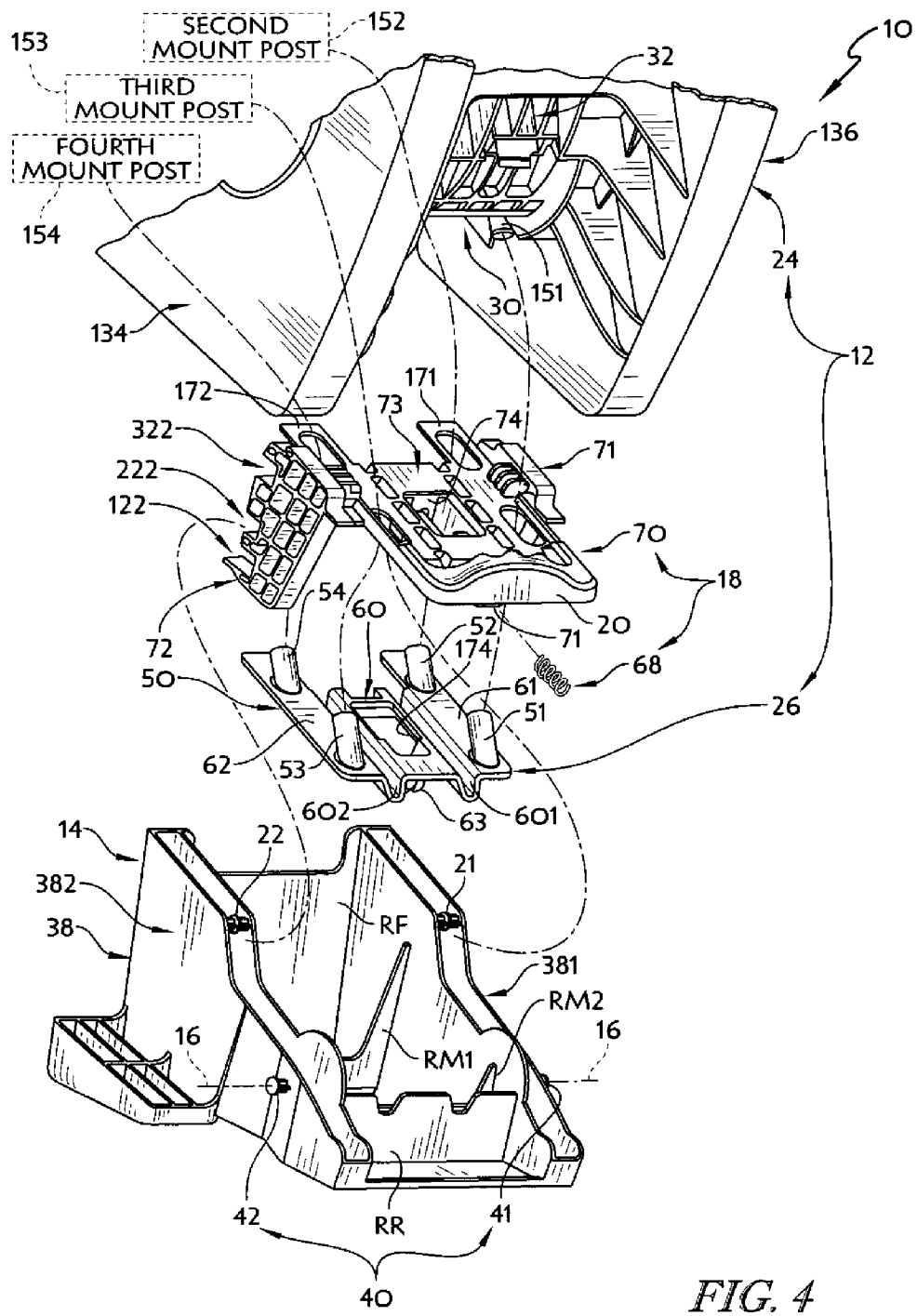
FIG. 4 is an enlarged exploded perspective assembly view of components included in the child restraint of FIGS. 1-3 and showing (from top to bottom) a lower rear portion of a seat shell included in the tiltable juvenile seat shown in FIG. 3, a seat lock including a slidable seat-motion blocker and a companion blocker-biasing spring, a seat-lock support included in the tiltable juvenile seat and provided with several angled post-receiver sockets arranged to be passed through companion slots formed in the slidable seat-motion blocker to mate with companion mount posts included in the seat shell to trap the spring-loaded slidable seat-motion blocker between an upwardly facing surface of the seat-lock support and a downwardly facing surface of the seat shell, and a seat base adapted to set on an underlying vehicle seat as suggested in FIGS. 6 and 7, a pivot mount comprising first and second pivot posts coupled to a lower portion of a foundation included in the seat base and mate with the seat shell to establish a pivot (tilt) axis, and first and second rod-shaped anchors coupled to an upper portion of the foundation included in the seat base and arranged to be engaged by the spring-loaded slidable seat-motion blocker to establish a selected tilted position of the seat shell of tiltable juvenile seat.
Figure 9:
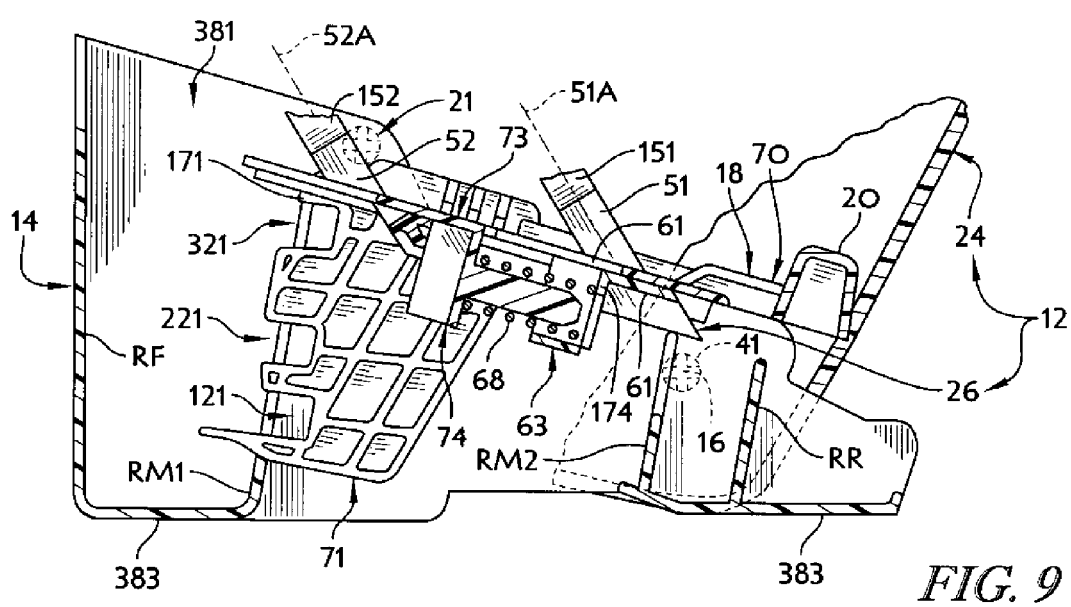
Figure 10:
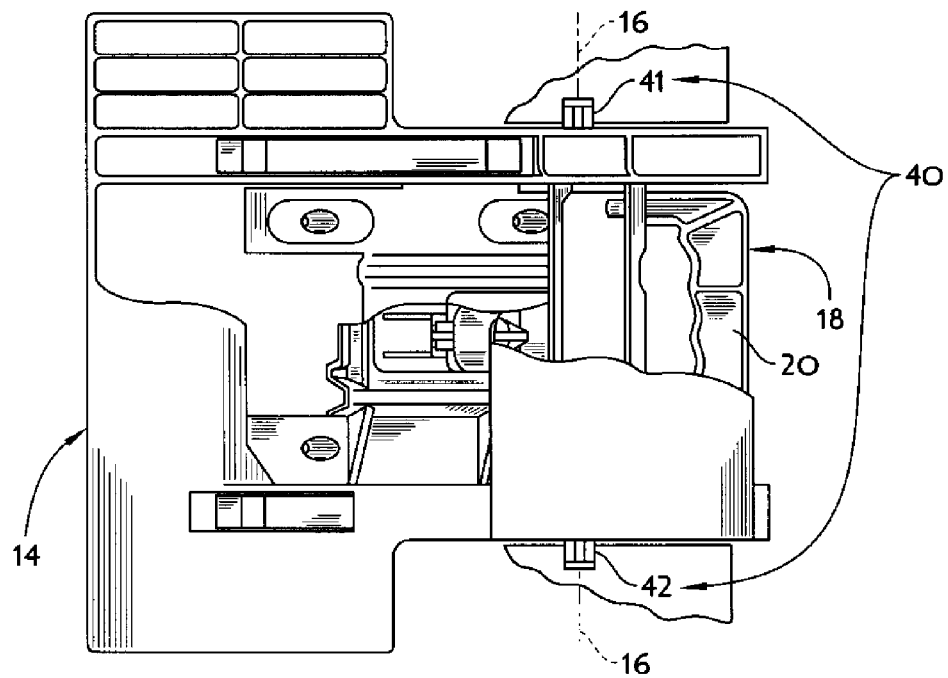
FIGS. 10 and 11 are partial bottom and side sectional views similar to FIGS. 8 and 9 showing that a caregiver has pulled the slidable seat-motion blocker to the right in a manner suggested in FIG. 12 to compress the companion blocker-biasing spring and move the first anchor mount included in the slidable seat-motion blocker to the right relative to the rod-shaped first anchor that is coupled to the upper portion of the seat base.

Seat shell 24 is shown in the upright position, for example, in FIGS. 1, 3, and 9. In this upright position, first and second motion blocking tabs 171, 172 included in seat lock 18 as shown, for example, in FIG. 4 are arranged normally to intercept and mate with companion rod-shaped first and second anchors 21, 22 included in seat base 14 to block pivotable movement of seat shell 24 about tilt axis 16 as suggested in FIG. 11. Seat lock 18 can be moved by a caregiver fro the extended position shown in FIG. 9 to a retracted position in FIG. 9 to move motion-blocking tabs 171, 172 away from anchors 21, 22 to free seat shell 24 to pivot about tilt axis 16.

Figure 14:
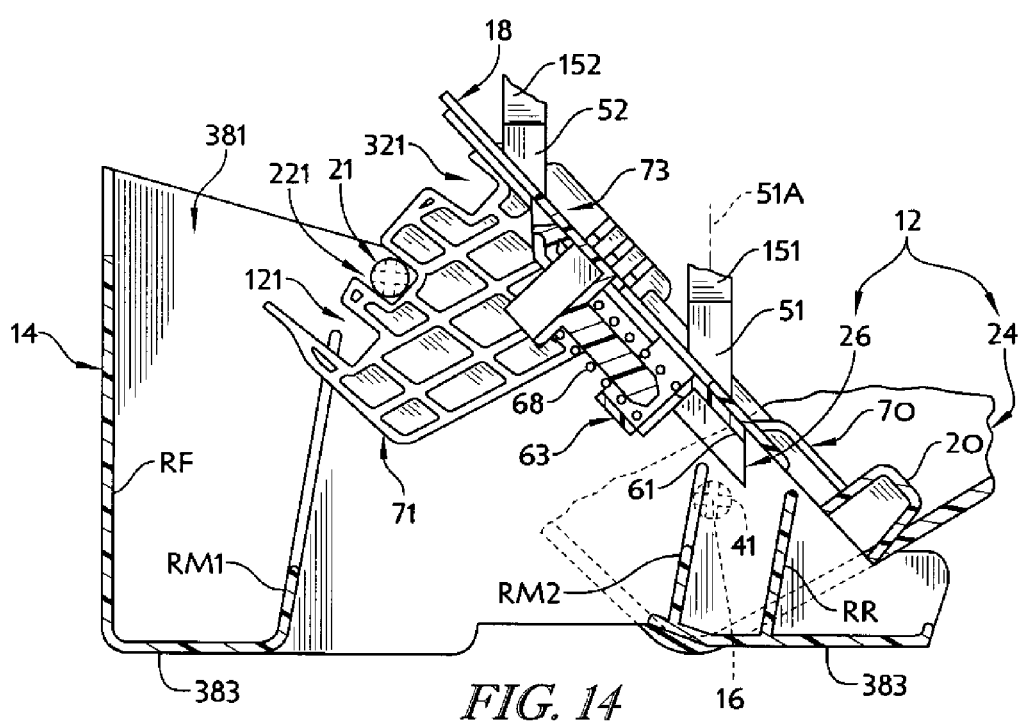
FIG. 14 is a partial sectional view similar to FIG. 13 showing that the caregiver has released the spring-loaded slidable seat-motion blocker to allow the spring to expand and slide the seat-motion blocker to the left to position the rod-shaped first anchor included in the seat base in the second (middle) anchor-receiver channel formed in the first anchor mount to retain the seat shell of the tiltable juvenile seat in the selected tilted position.

Seat shell 24 is retained in a second of three available tilted positions as shown, for example, in FIG. 14 in which a rod-shaped first anchor 21 included in seat base 14 is retained in a second (middle) anchor-receiver channel 221 formed in a seat-motion blocker 70 of seat lock 18 to block motion of seat shell 24 of tiltable juvenile seat 12 about pivot tilt axis 16 relative to seat base 14. Seat shell 24 could be retained in a relatively lower first tilted position (not shown), if rod-shaped first anchor 21 is retained in a first (low) anchor-receiver channel 121 formed in seat-motion blocker 70 of seat lock 18 as shown in FIG. 14. Seat shell 24 could also be retained in a relatively higher third tilted position (not shown) if rod-shaped first anchor 21 is retained in a third (high) anchor-receiver channel 321 formed in seat-motion blocker 70 of seat lock 18 as shown in FIG. 14. A caregiver can move seat lock 18 to the retracted position to free seat shell 24 to pivot about tilt axis 16.

Tiltable juvenile seat 12 includes seat shell 24 and a seat-lock support 26 arranged to mate with seat shell 24 to support seat lock 18 for sliding movement relative to seat shell 24 as suggested in FIGS. 3 and 4. Seat-lock support 26 is mounted on an underside of seat shell 24 to provide a space between seat shell 24 and seat-lock support 26 for receiving seat-motion blocker 70 of seat lock 18 for sliding movement therein.

In illustrative embodiments, tiltable juvenile seat 12 also includes an optional headrest 28 mounted for up-and-down movement on seat shell 24 and an optional infant holder 29 sized to rest on seat shell 24 and hold an infant in a reclined orientation in seat shell 24 as suggested in FIGS. 1 and 2. Tiltable juvenile seat 12 may also include a suitable child-restraint harness (not shown) coupled to seat shell 24 in an illustrative embodiment.

Figure 5:
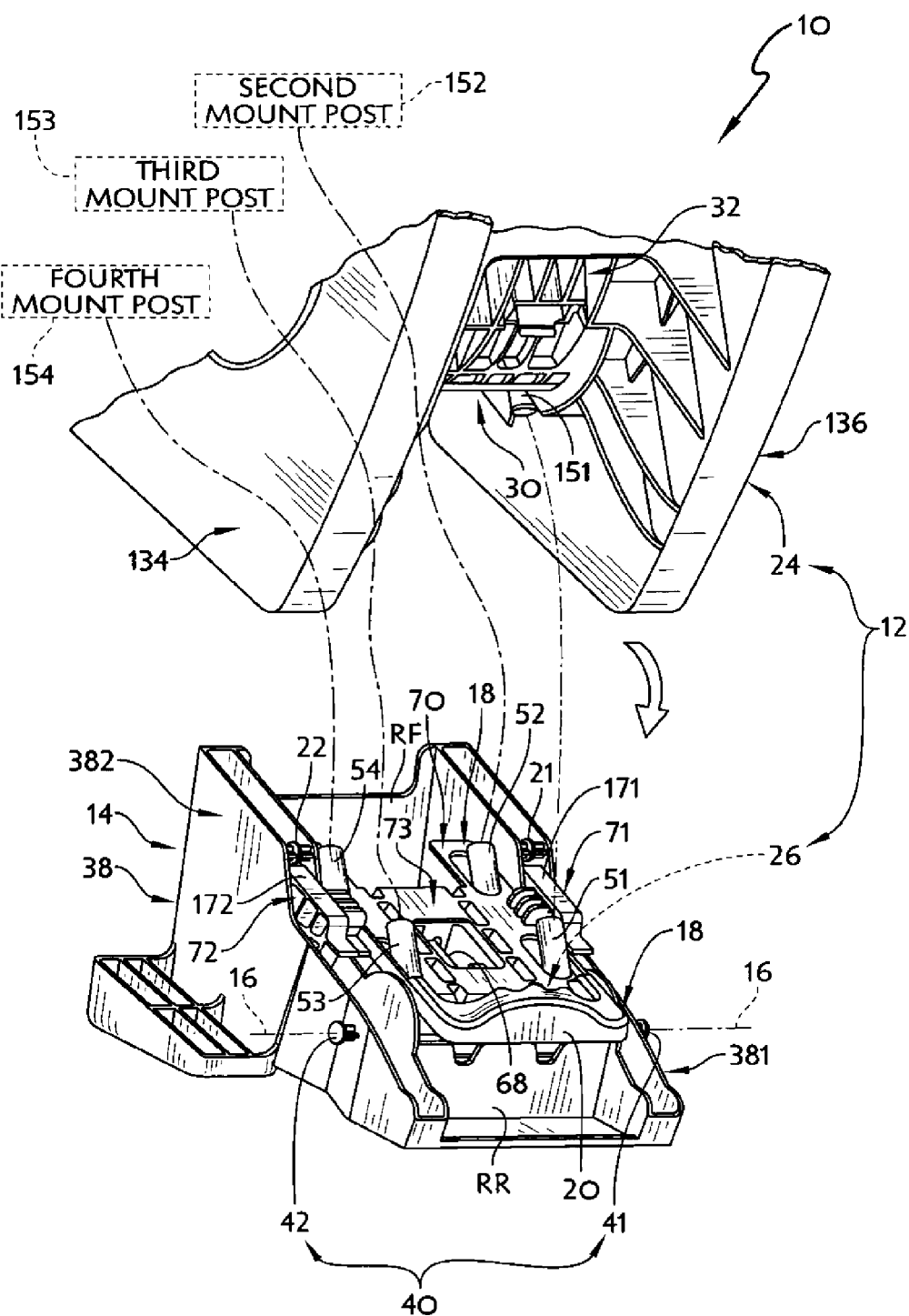
FIG. 5 is an enlarged perspective view similar to FIG. 4 showing the seat lock lying on top of the seat-lock support and suggesting downward movement of the seat shell to cause four downwardly extending mount posts included in the seat shell to mate with four upwardly extending companion post-receiver sockets included in the seat-lock support and to mount the seat shell onto the two outwardly projecting posts of the pivot mount to support the seat shell of the tiltable juvenile seat for tilting movement about a pivot (tilt) axis relative to the seat base as suggested in FIGS. 6 and 7.

Seat shell 24 includes a seat bottom 30 and a seat back 32 arranged to extend upwardly from seat bottom 30 as suggested in FIGS. 1, 6, and 7. In illustrative embodiments, seat shell 24 also includes a first side-wing panel 34 coupled to one side of seat bottom 30 and seat back 32 and an opposing second side-wing panel 36 coupled to an opposite side of seat bottom 30 and seat back 32. Each of seat bottom 30 and seat back 32 are arranged to extend laterally between first and second side-wing panels 34, 36. Seat shell 24 also includes first and second ribs 134, 136 extending rearwardly from seat back 32 and downwardly from seat bottom 30 as shown, for example, in FIG. 3. In illustrative embodiments, seat-lock support 26 is coupled to the underside of seat bottom 30 and arranged to lie under seat bottom 30 as suggested in FIGS. 4 and 5. Pull handle 20 of the seat-motion blocker 70 that is supported for sliding movement on seat-lock support 26 and under seat bottom 30 is exposed on the rear side of child restraint 10 as suggested in FIG. 3 so that pull handle 20 can be gripped easily by a caregiver as suggested in FIG. 12 while child restraint 10 is placed on a passenger seat 100 in a vehicle as suggested in FIGS. 6 and 7.

Seat base 14 includes a foundation 38, a pivot mount 40 coupled to foundation 38 to establish pivot (tilt) axis 16 and support seat shell 24 for pivotable movement about pivot (tilt) axis 16 as seat shell 24 is pivoted by a caregiver between upright and tilted positions, and first and second anchors 21, 22 coupled to foundation 38 In an illustrative embodiment, pivot mount 40 includes a first pivot post 41 coupled to one side of foundation 38 and a second pivot post 42 coupled to another side of foundation 38 as shown, for example, in FIG. 4. First and second anchors 21, 22 are arranged to mate with seat lock 18 to retain seat shell 24 of tiltable juvenile seat 12 temporarily in a selected one of several (e.g., three) tilted positions. In an illustrative embodiment, each of anchors 21, 22 is rod-shaped and relatively short as suggested in FIG. 4.

Figure 8:
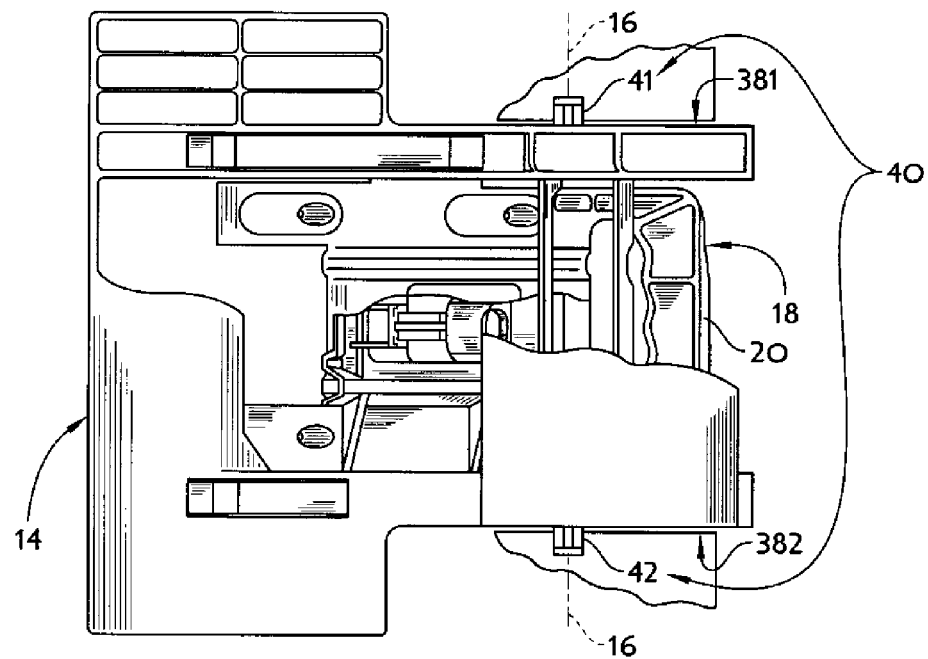
FIGS. 8 and 9 are partial bottom and side sectional views of the child restraint showing the seat shell of the tiltable juvenile seat in the upright position of FIG. 1.

Foundation 38 of seat base 14 is adapted to set on a passenger seat 100 in a vehicle as suggested in FIGS. 6 and 7 and includes a first frame leg 381 and a second frame leg 382 arranged to lie in spaced-apart relation to first frame leg 381 as suggested in FIG. 4. First pivot post 41 is coupled to an exterior wall of first frame leg 381 and second pivot post 42 is coupled to an exterior wall of second frame leg 382 in an illustrative embodiment as suggested in FIGS. 4 and 8. Foundation 38 also includes a rigidifier comprising one or more of front, first middle, second middle, and rear rigidifying plates RF, RM1, RM2, and RR arranged to lie between and interconnect interior walls of first and second frame legs 381, 382 as suggested in FIG. 4. A floor 383 is included in foundation 38 and coupled to lower ends of first and second frame legs 381, 382.

First anchor 21 is located between and coupled to each of the interior and exterior walls of first frame leg 381 and aligned generally with first middle rigidifying plate RM1 as suggested in FIG. 4. Second anchor 22 is located between and coupled to each of the interior and exterior walls of the second frame leg 382 an aligned generally with first middle rigidifying plate RM1 as suggested in FIG. 4.

Seat-lock support 26 of tiltable juvenile seat 12 includes a slide plate 50 and four post-receiver sockets 51-54 coupled to slide plate 50 and arranged to extend upwardly and mate with seat shell 24 as suggested in FIG. 4 to retain seat-lock support 26 in a stationary position underneath seat bottom 30 of seat shell 24 and yet allow back-and-forth slidable movement of seat-motion blocker 70 in the space provided between seat bottom 30 and slide plate 50 of seat-lock support 26. In an illustrative embodiment, seat shell 24 includes four downwardly extending mount posts 151-154 coupled to seat bottom 30 and each of the mount posts 151-154 is arranged to mate with a companion one of the upwardly extending post-receiver sockets 51-54 using any suitable means to retain slide plate 50 of seat-lock support 26 in a stationary position under seat bottom 30 of seat shell 24.

Slide plate 50 includes a central panel 60, a first side panel 61 coupled to one side of central panel 60 and coupled to root ends of first and second post-receiver sockets 51, 52, and a second side panel 62 coupled to an opposite side of central panel 60 and coupled to root ends of third and fourth post-receiver sockets 53, 54 as suggested in FIG. 4. Central panel 60 is arranged to lie between and interconnect first and second side panels 61, 62. In an illustrative embodiment, central panel 60 is formed to include upwardly opening first and second guide channels 601, 602 as suggested in FIG. 4. Guide channels 601, 602 are arranged to lie in spaced-apart parallel relation to one another as suggested in FIG. 4. A first spring mount 63 configured to mate with blocker-biasing spring 68 is also included in slide plate 50 and coupled to central panel 60 and arranged to lie below central panel 60 as suggested in FIG. 9. First post-receiver socket 51 is formed to extend along a central axis 51A that is oriented to cooperate with first side panel 61 to define an acute included angle therebetween as suggested in FIG. 9.

Figure 11:
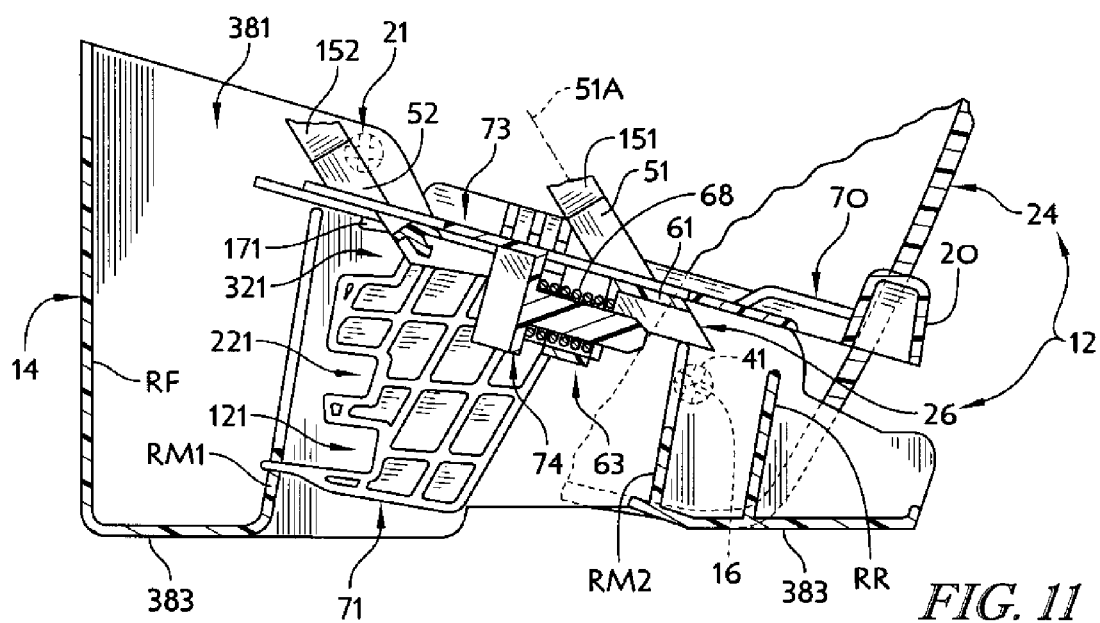
Figure 12:
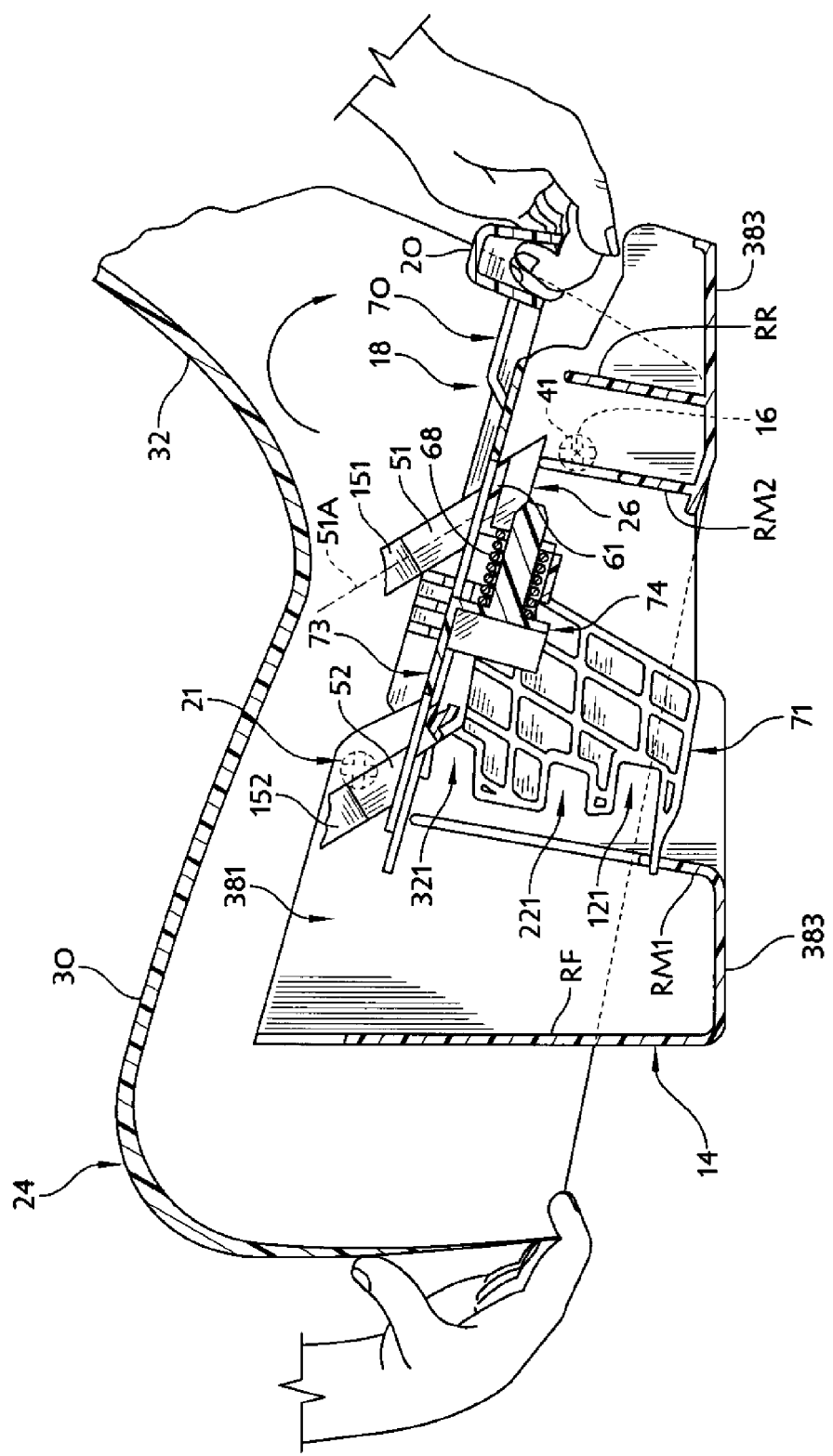
FIG. 12 is a sectional view similar to FIG. 11 but showing the seat shell in section and suggesting that a caregiver can tilt the seat shell of the tiltable juvenile seat in a clockwise direction about the pivot (tilt) axis established by the first pivot post coupled to a lower (rearward) portion of the foundation by first pulling the slidable seat-motion blocker to the right using a left hand and then by lifting upwardly on a front portion of the tiltable juvenile seat using a right hand.
Figure 13:
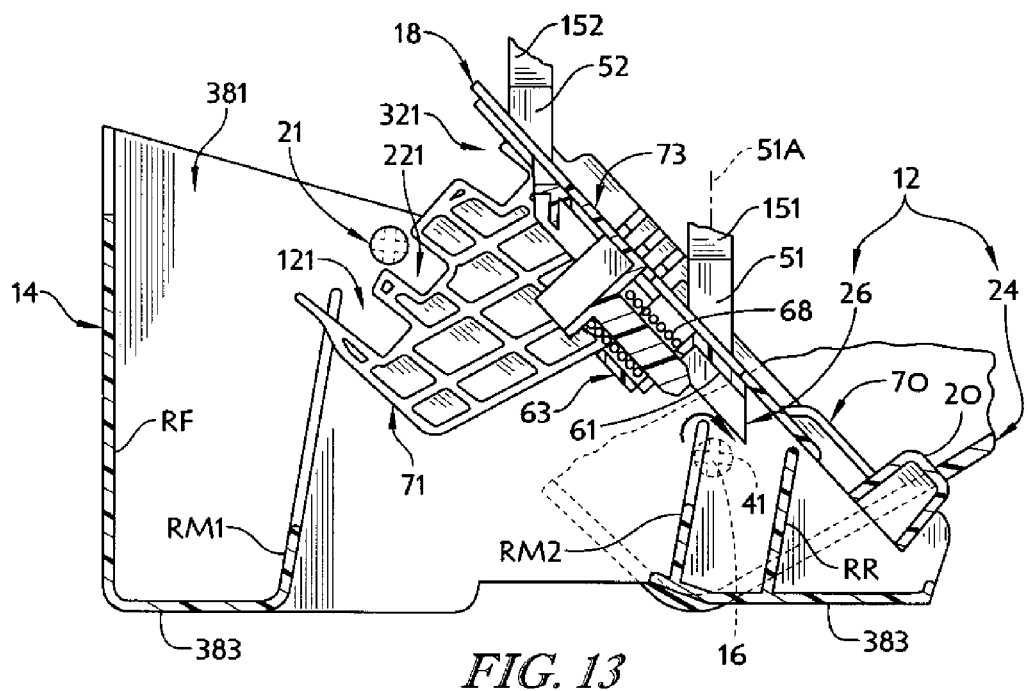
FIG. 13 is a partial sectional view similar to FIGS. 9 and 10 showing that the seat shell of the tiltable juvenile seat has been pivoted in a clockwise direction about the pivot (tilt) axis to cause a mouth formed in a front edge of the first anchor mount of the spring-biased slidable seat-motion blocker to open into a second (middle) anchor-receiver channel formed in the first anchor mount to be aligned with the stationary rod-shaped first anchor included in the seat base.

Seat lock 18 includes a slidable seat-motion blocker 70 and a blocker-biasing spring 68 as shown, for example, in FIGS. 4, 9, and 12. Blocker-biasing spring 68 is coupled at one end to spring mount 63 of slide plate 50 and at an opposite end to slidable seat-motion blocker 70 and configured to provide means for yieldably urging slidable seat-motion blocker 70 away from retracted positions shown, for example, in FIGS. 11 and 13 to assume an extended position relative to seat base 14 as shown, for example, in FIGS. 9, 12, and 14.

Slidable seat-motion blocker 70 includes a central glider 73, a first anchor mount 71 coupled to one side of central glider 73, and a second anchor mount 72 coupled to an opposite side of central glider 73 as shown, for example, in FIG. 4. Central glider 73 is coupled to pull handle 20 and is arranged to mate in sliding relation with the underlying slide plate 50 included in seat-lock support 26. Central glider 73 is formed to include two downwardly extending rails and each rail is arranged to ride in one of the guide channels 601, 602 formed in slide plate 50 during back-and-forth sliding movement of central glider 73 on the underlying slide plate 50. First anchor mount 71 is configured to mate with first anchor 21 and second anchor mount 72 is configured to mate with second anchor 22 temporarily to retain seat shell 24 of tiltable juvenile seat 12 in a tilted position relative to seat base 14 as shown, for example, in FIG. 14.

Slidable seat-motion blocker 70 further includes a second spring mount 74 configured to mate with blocker-biasing spring 68 and coupled to central glider 73. Second spring mount 74 is arranged to lie below central glider 73 in confronting relation to first spring mount 63 as shown, for example, in FIG. 9.

First anchor mount 71 is arranged to extend downwardly from a right side of central glider 73 as shown, for example, in FIG. 4. First anchor mount 71 is formed to include, in series, first (low) anchor-receiver channel 121, second (middle) anchor-receiver channel 221, and third (high) anchor-receiver channel 321 as shown, for example, in FIGS. 9 and 12. Each of anchor-receiver channels 121, 221, 321 is sized to receive first anchor 21 therein to establish one of the three available tilted positions of seat shell 24 of tiltable juvenile seat 12.

Second anchor mount 72 is arranged to extend downwardly from a left side of central glider 73 as shown, for example, in FIG. 4. Second anchor mount 72 is formed to include, in series, first (low) anchor-receiver channel 221, second (middle) anchor-receiver channel 222, an third (high) anchor-receiver channel 322 as shown, for example, in FIG. 4. Each of anchor-receiver channels 221, 222, 322 is sized to receive second anchor 22 herein to establish one of the three available tilted positions of seat shell 24 of tiltable juvenile seat 12.

In the upright position of seat shell 24 of tiltable juvenile seat 12, rod-shaped first anchor 21 lies above first anchor mount 71 of slidable seat-motion blocker 70 as suggested in FIG. 9. As such, first anchor 21 is located outside of each of the first, second, and third anchor-receiver channels 121, 221, 321 formed in first anchor mount 71. Similarly, rod-shaped second anchor 22 lies about second anchor mount 72 and outside of each of the first, second, and third anchor-receiver channels 122, 222, 322 formed is second anchor mount 72.

To move seat shell 24 of tiltable juvenile seat 12 about pivot (tilt) axis 16 to assume one of the three available tilt positions, a caregiver first grips pull handle 12 and pulls slidable seat-motion blocker 70 to the right to compress blocker-biasing spring 68 as suggested in FIGS. 11 and 12. This causes the first and second anchor mounts 71, 72 included in seat-motion blocker 70 to move to the right relative to the stationary rod-shaped first and second anchors 21, 22 included in seat base 18. The caregiver then pivots the seat shell 24 of tiltable juvenile seat 12 in a clockwise direction about pivot (tilt) axis 16 as suggested in FIG. 13 to align, for example, first anchor 21 with a mouth of second (middle) anchor-receiver channel 221 formed in first anchor mount 71 (second anchor 22 is also simultaneously aligned with a mouth of second (middle) anchor-receiver channel 222 formed in second anchor mount 72). Finally, the caregiver releases pull handle 20 of the spring-loaded slidable seat-motion blocker 70 to allow blocker-biasing spring 68 to expand and slide seat-motion blocker 70 to the left to position first anchor 21 in the second (middle) anchor-receiver channel 221 (and to position simultaneously second anchor 22 in the second (middle) anchor-receiver channel 222) so that seat shell 24 of tiltable juvenile seat 12 is retained in a selected tilted position.

The invention claimed is:
1. A child restraint comprising
   a tiltable juvenile seat including a seat shell having a seat bottom and a seat back extending upwardly from the seat bottom and
   a seat base including a foundation adapted to set on a passenger seat in a vehicle, a pivot mount coupled to the foundation to establish a tilt axis and to the seat shell to support the seat shell for pivotable movement about the tilt axis as the seat shell is pivoted by a caregiver between upright and tilted positions, and a first anchor coupled to the foundation, wherein the tiltable juvenile seat further includes a seat lock configured to provide caregiver-controlled means for releasably retaining the seat shell in a selected tilted position and a seat-lock support arranged to mate with the seat shell to support the seat lock for sliding movement relative to the seat shell and wherein the seat lock includes a slidable seat-motion blocker and a blocker-biasing spring coupled to slidable seat-motion blocker and configured to provide means for yieldably urging the slidable seat-motion blocker on the seat-lock support and under the seat bottom from a retracted position disengaging the first anchor coupled to the foundation to free the seat shell for pivotable movement about the tilt axis relative to the foundation toward an extended position arranged to engage the first anchor to block pivoting movement of the seat shell about the tilt axis relative to the foundation to retain the seat shell in a selected one of the upright and tilted positions, wherein the seat-lock support includes a slide plate located between the foundation and the seat bottom and arranged to support the slidable seat-motion blocker for sliding movement thereon and a first post-receiver socket coupled to the slide plate and the seat shell includes a first downwardly extending mount post coupled to the seat bottom and arranged to mate with the post-receiver socket to retain the slide plate in a stationary position relative to the seat bottom, and wherein the mount post extends through the seat motion blocker.

2. The child restraint of claim 1, wherein the slide plate includes a side panel and the post-receiver socket is formed to extend along a central axis that is oriented to cooperate with the side panel to define an acute included angle therebetween.

3. The child restraint of claim 1, wherein the post-receiver socket is formed to include a post-receiver channel opening toward the seat bottom and the downwardly extending mount post is arranged to extend into the post-receiver channel.

4. The child restraint of claim 1, wherein the slide plate includes a central panel, a first side panel coupled to one side of the central panel, and a second side panel coupled to an opposite side of the central panel, the central panel is formed to include a guide channel formed to open upwardly toward the slidable seat-motion blocker to receive therein a central glider included in the slidable seat-motion blocker to guide slidable seat-motion blocker as it slides back and forth on the slide plate, and the first post-receiver socket is coupled to the first side panel.

5. The child restraint of claim 4, wherein the seat-lock support further includes an auxiliary post-receiver socket coupled to the second side panel of the slide plate and the seat shell further includes an auxiliary downwardly extending mount post coupled to the seat bottom and arranged to mate with the auxiliary post-receiver socket to retain the slide plate in a stationary position relative to the seat bottom.

6. A child restraint comprising a tiltable juvenile seat including a seat shell having a seat bottom and a seat back extending upwardly from the seat bottom and a seat base including a foundation adapted to set on a passenger seat in a vehicle, a pivot mount coupled to the foundation to establish a tilt axis and to the seat shell to support the seat shell for pivotable movement about the tilt axis as the seat shell is pivoted by a caregiver between upright and tilted positions, and a first anchor coupled to the foundation, wherein the tiltable juvenile seat further includes a seat lock configured to provide caregiver-controlled means for releasably retaining the seat shell in a selected tilted position and a seat-lock support arranged to mate with the seat shell to support the seat lock for sliding movement relative to the seat shell and wherein the seat lock includes a slidable seat-motion blocker and a blocker-biasing spring coupled to slidable seat-motion blocker and configured to provide means for yieldably urging the slidable seat-motion blocker on the seat-lock support and under the seat bottom from a retracted position disengaging the first anchor coupled to the foundation to free the seat shell for pivotable movement about the tilt axis relative to the foundation toward an extended position arranged to engage the first anchor to block pivoting movement of the seat shell about the tilt axis relative to the foundation to retain the seat shell in a selected one of the upright and tilted positions, wherein the slidable seat-motion blocker includes a central glider, a first anchor mount coupled to a forward portion of the central glider, and a pull handle coupled to a rearward portion of the central glider, the central glider is configured to include a downwardly extending rail that is arranged to ride on top of a guide channel formed in the seat-lock support, and the first anchor mount is configured to mate with the first anchor to retain the seat shell in a selected one of the upright and tilted position.

7. The child restraint of claim 6, wherein the seat base further includes a second anchor coupled to the foundation, the first anchor mount is coupled to one side of the central glider, the slidable seat-motion blocker further includes a second anchor mount coupled to the forward portion of the central glider and arranged to lie in spaced-apart relation to the first anchor mount, and the second anchor mount is configured to mate with the second anchor to retain the seat shell in a selected one of the upright and tilted positions.

8. The child restraint of claim 7, wherein the foundation includes a first frame leg and a second frame leg arranged to lie in spaced-apart relation to the first frame leg, and a rigidifier arranged to interconnect first and second frame legs to retain the first and second frame legs to retain the first and second frame legs in stationary positions, the first anchor mount is coupled to the first frame leg, and the second anchor mount is coupled to the second frame leg.

9. The child restraint of claim 8, where the first frame leg includes an outwardly facing surface facing away from the second frame leg and mating with a first pivot post included in the pivot mount and the second frame leg includes an outwardly facing surface facing away from the first frame leg and mating with a second pivot post included in the pivot mount, the first anchor mount is coupled to the first frame leg, and the second anchor mount is coupled to the second frame leg.

10. The child restraint of claim 9, wherein the foundation further includes a rigidifying plate arranged to interconnect the first and second frame legs and the seat-lock support is arranged to lie between the rigidifying plate and the slidable seat-motion blocker.

11. The child restraint of claim 7, wherein the first anchor mount is arranged to extend downwardly from a right side of the central glider, the first anchor mount is formed to include a first low first anchor-receiver channel and a first high first anchor-receiver channel, each of the first anchor-receiver channels is sized to receive the first anchor therein to establish one of the tilted positions, the second anchor mount is arranged to extend downwardly from an opposite left side of the central glider, the second anchor mount is formed to include a low second anchor-receiver channel and a high second anchor-receiver channel, and each of the second anchor-receiver channels is sized to receive the second anchor therein to establish one of the tilted positions.

12. The child restraint of claim 6, wherein the first anchor mount is formed to include a first anchor-receiver channel, the first anchor is arranged to extend into the first anchor-receiver channel when the slidable seat-motion blocker is arranged to lie in the extended position to establish the tilted position of the seat shell, and the first anchor is arranged to lie between the seat bottom and the first anchor mount when the slidable seat-motion blocker is arranged to lie in the extended position to establish the upright position of the seat shell.

13. A child restraint comprising
a tiltable juvenile seat including a seat shell having a seat bottom and a seat back extending upwardly from the seat bottom and
a seat base including a foundation adapted to set on a passenger seat in a vehicle, a pivot mount coupled to the foundation to establish a tilt axis and to the seat shell to support the seat shell for pivotable movement about the tilt axis as the seat shell is pivoted by a caregiver between upright and tilted positions, and a first anchor coupled to the foundation, wherein the tiltable juvenile seat further includes a seat lock configured to provide caregiver-controlled means for releasably retaining the seat shell in a selected tilted position and a seat-lock support arranged to mate with the seat shell to support the seat lock for sliding movement relative to the seat shell and wherein the seat lock includes a slidable seat-motion blocker and a blocker-biasing spring coupled to slidable seat-motion blocker and configured to provide means for yieldably urging the slidable seat-motion blocker on the seat-lock support and under the seat bottom from a retracted position disengaging the first anchor coupled to the foundation to free the seat shell for pivotable movement about the tilt axis relative to the foundation toward an extended position arranged to engage the first anchor to block pivoting movement of the seat shell about the tilt axis relative to the foundation to retain the seat shell in a selected one of the upright and tilted positions,
wherein the slidable seat-motion blocker includes a central glider, a first anchor mount coupled to a forward portion of the central glider, and a pull handle coupled to a rearward portion of the central glider, the central glider is configured to include a downwardly extending rail that is arranged to ride in a guide channel formed in the seat-lock support, and the first anchor mount is configured to mate with the first anchor to retain the seat shell in a selected one of the upright and tilted position,
wherein the seat base further includes a second anchor coupled to the foundation, the first anchor mount is coupled to one side of the central glider, the slidable seat-motion blocker further includes a second anchor mount coupled to the forward portion of the central glider and arranged to lie in spaced-apart relation to the first anchor mount, and the second anchor mount is configured to mate with the second anchor to retain the seat shell in a selected one of the upright and tilted positions,
wherein the foundation includes a first frame leg and a second frame leg arranged to lie in spaced-apart relation to the first frame leg, and a rigidifier arranged to interconnect first and second frame legs to retain the first and second frame legs to retain the first and second frame legs in stationary positions, the first anchor mount is coupled to the first frame leg, and the second anchor mount is coupled to the second frame leg,
where the first frame leg includes an outwardly facing surface facing away from the second frame leg and mating with a first pivot post included in the pivot mount and the second frame leg includes an outwardly facing surface facing away from the first frame leg and mating with a second pivot post included in the pivot mount, the first anchor mount is coupled to the first frame leg, and the second anchor mount is coupled to the second frame leg, and
wherein the first frame leg includes exterior and interior walls, the first anchor mount is arranged to lie between and to interconnect the exterior and interior walls of the first frame leg, and the first pivot mount is coupled to the exterior wall and arranged to lie outside of space provided between the exterior and interior walls of the first frame leg, the second frame leg includes exterior and interior walls, the second anchor mount is arranged to lie between and to interconnect the exterior and interior walls of the second frame leg, and the second pivot mount is coupled to the exterior wall and arranged to lie outside space provided between the exterior and interior walls of the second frame leg.

14. A child restraint comprising
a tiltable juvenile seat including a seat shell having a seat bottom and a seat back extending upwardly from the seat bottom and
a seat base including a foundation adapted to set on a passenger seat in a vehicle, a pivot mount coupled to the foundation to establish a tilt axis and to the seat shell to support the seat shell for pivotable movement about the tilt axis as the seat shell is pivoted by a caregiver between upright and tilted positions, and a first anchor coupled to the foundation, wherein the tiltable juvenile seat further includes a seat lock configured to provide caregiver-controlled means for releasably retaining the seat shell in a selected tilted position and a seat-lock support arranged to mate with the seat shell to support the seat lock for sliding movement relative to the seat shell and wherein the seat lock includes a slidable seat-motion blocker and a blocker-biasing spring coupled to slidable seat-motion blocker and configured to provide means for yieldably urging the slidable seat-motion blocker on the seat-lock support and under the seat bottom from a retracted position disengaging the first anchor coupled to the foundation to free the seat shell for pivotable movement about the tilt axis relative to the foundation toward an extended position arranged to engage the first anchor to block pivoting movement of the seat shell about the tilt axis relative to the foundation to retain the seat shell in a selected one of the upright and tilted positions,
wherein the slidable seat-motion blocker includes a central glider, a first anchor mount coupled to a forward portion of the central glider, and a pull handle coupled to a rearward portion of the central glider, the central glider is configured to include a downwardly extending rail that is arranged to ride in a guide channel formed in the seat-lock support, and the first anchor mount is configured to mate with the first anchor to retain the seat shell in a selected one of the upright and tilted position,
wherein the first anchor mount is formed to include a first anchor-receiver channel, the first anchor is arranged to extend into the first anchor-receiver channel when the slidable seat-motion blocker is arranged to lie in the extended position to establish the tilted position of the seat shell, and the first anchor is arranged to lie between the seat bottom and the first anchor mount when the slidable seat-motion blocker is arranged to lie in the extended position to establish the upright position of the seat shell, and wherein the foundation includes a floor adapted to mate with a passenger seat on the vehicle and the first anchor mount is arranged to lie in a space provided between the floor and the first anchor in response to pivoting movement of the seat shell about the tilt axis to assume the upright position.

15. A child restraint comprising a tiltable juvenile seat including a seat shell having a seat bottom and a seat back extending upwardly from the seat bottom and a seat base including a foundation adapted to set on a passenger seat in a vehicle, a pivot mount coupled to the foundation to establish a tilt axis and to the seat shell to support the seat shell for pivotable movement about the tilt axis as the seat shell is pivoted by a caregiver between upright and tilted positions, and a first anchor coupled to the foundation, wherein the tiltable juvenile seat further includes a seat lock configured to provide caregiver-controlled means for releasably retaining the seat shell in a selected tilted position and a seat-lock support arranged to mate with the seat shell to support the seat lock for sliding movement relative to the seat shell and wherein the seat lock includes a slidable seat-motion blocker and a blocker-biasing spring coupled to slidable seat-motion blocker and configured to provide means for yieldably urging the slidable seat-motion blocker on the seat-lock support and under the seat bottom from a retracted position disengaging the first anchor coupled to the foundation to free the seat shell for pivotable movement about the tilt axis relative to the foundation toward an extended position arranged to engage the first anchor to block pivoting movement of the seat shell about the tilt axis relative to the foundation to retain the seat shell in a selected one of the upright and tilted positions, and wherein the seat-lock support includes a slide plate arranged to lie under and support the slidable seat-motion blocker and a first spring mount coupled to the slide plate, the slidable seat-motion blocker includes a central glider arranged to slide on the slide plate and a second spring mount coupled to the central glider to move therewith, and the blocker-biasing spring is coupled at one end to the first spring mount and at an opposite end to the second spring mount.

16. The child restraint of claim 15, wherein the slidable seat-motion blocker includes a central glider, a first anchor mount coupled to a forward portion of the central glider, and a pull handle coupled to a rearward portion of the central glider, the central glider is configured to include a downwardly extending rail that is arranged to ride in a guide channel formed in the seat-lock support, and the first anchor mount is configured to mate with the first anchor to retain the seat shell in a selected one of the upright and tilted position, the slide plate is formed to include an aperture, and the second spring mount is arranged to extend downwardly through the aperture formed in the slide plate and lie in confronting relation to the first spring mount.

17. The child restraint of claim 16, wherein the blocker-biasing spring is arranged to lie between the first anchor mount and the first pivot mount.

\* \* \* \* \*